United States Patent [19]
Truesdell et al.

[11] Patent Number: 5,229,975
[45] Date of Patent: Jul. 20, 1993

[54] VEHICLE PROXIMITY SENSOR

[75] Inventors: Dave Truesdell, Acton, Mass.; E. Thomas Mariner, North Babylon, N.Y.

[73] Assignee: Dynatech Corporation, Burlington, Mass.

[21] Appl. No.: 893,325

[22] Filed: Jun. 3, 1992

[51] Int. Cl.$^5$ ............................................. G01S 15/93
[52] U.S. Cl. .................................... 367/107; 367/907; 367/99
[58] Field of Search ................. 367/99, 107, 111, 909; 340/903, 904; 342/118, 70, 71, 72; 356/3, 5; 364/561

[56] References Cited
U.S. PATENT DOCUMENTS

| | | | |
|---|---|---|---|
| 3,573,817 | 4/1971 | Akers | 340/420 |
| 3,898,652 | 8/1975 | Rashid | |
| 4,203,632 | 5/1980 | Fabreges | 303/100 |
| 4,500,977 | 2/1985 | Gelhard | 367/108 |
| 4,694,295 | 9/1987 | Miller et al. | 340/903 |
| 4,833,469 | 5/1989 | David | 340/901 |
| 4,916,450 | 4/1990 | Davis | 342/71 |
| 4,937,796 | 6/1990 | Tendler | 367/909 |
| 4,974,215 | 11/1990 | Bolz et al. | 367/108 |

OTHER PUBLICATIONS

Newspaper article, USA Today, 12A Friday, Apr. 17, 1992, entitled "Greyhounds tries anti-crash radar on buses".
Product Information for Clarion entitled "An Eye Toward Safety".
Product Information for Safety Technology, Inc., entitled "The Ultrasonic Sensor With A Rear View."
Product Information for Vehicle Components Corporation, entitled "The Blind Spotter Sees When the Driver Can't".
Product Information for Technodyne Research International, Inc., entitled "Don't Back Up Without Protex Safety Sensors".
Product Information for BackStop Inc., entitled "A Crash Course In Avoiding Reverse Crashes."
Product Information for Poly-Optical Products Inc., entitled "Open Your Eyes With Optiview".
Product Information for C.A.R.E., Inc., entitled "C.A.R.E-The Eyes of Safety".
Magazine Advertisement for Ranger II, entitled "Ranger II Distance Measuring System," Fleet Owner/May 1992.

Primary Examiner—Daniel T. Pihulic
Attorney, Agent, or Firm—Weingarten, Schurgin, Gagnebin & Hayes

[57] ABSTRACT

A vehicle sensing system includes a data bus, a first microprocessor coupled to the bus and a plurality of sensor modules about a vehicle periphery for detecting the presence of objects within a predetermined range of distances of each of such sensor modules. Each sensor module of the vehicle sensing system includes a transducer, a second microprocessor, coupled between the transducer and the bus, for processing information received from the transducer, and a light emitting diode disposed on an outer surface of a housing for the transducer, coupled to the second microprocessor, for indicating when an object is within the predetermined distance of the sensor module or when the sensor module is faulty. Each sensor module further includes a temperature sensing circuit coupled to the second microprocessor and a bus transceiver for receiving information from the bus and for transmitting information to the bus.

24 Claims, 8 Drawing Sheets

FIG. 6

VEHICLE PROXIMITY SENSOR

BACKGROUND OF THE INVENTION

This invention relates to alternate vision systems and more particularly to vehicle mounted proximity sensing systems.

As is known in the art, alternate vision systems are near proximity detection systems designed to be used in conjunction with the mirroring system of a motor vehicle. Such systems alert the driver of the vehicle on which the system is mounted to the existence of an object in a vehicle's blind spot, e.g., that area to the side and rear of the vehicle which is not visible through the use of mirrors or other means. These blind spots generally exist, for example, near the rear ends of a car, next to the rear wheels of a truck or next to the right side of a truck and in particular next to the right side of the cab of the truck.

Often an entire car, motorcycle or other object travelling along side a truck may be totally undetectable by a driver of the truck even after the driver checks his rear view mirrors. Thus, driving blindspots are a significant problem and lead to accidents. This problem will become more frequent as roads become more congested and cars themselves become smaller making them less apt to be viewed through the mirroring system of a larger vehicle such as a truck, for example.

Furthermore, in addition to the blind spots mentioned above, it may be desirable in specialized vehicles to detect an object in the front area of the vehicle. For example a school bus may have a need to detect the presence of small children near a front region of the bus when the children enter and exit the bus.

One solution to this problem is to provide a proximity sensor on every side of a vehicle. Such sensors are typically provided as infrared, radar, or ultrasonic detectors. The sensors are typically coupled to a central computer system which is in turn coupled to a control and display console which is typically disposed where the driver of the vehicle may view the display.

One problem with this approach, however, is that the display console typically does not provide an indication of which sensor is in close proximity to an object. Thus, even though the operator of a vehicle may know that he is in close proximity to some object, he may not be aware of the particular location of the object.

A second problem with this approach is that it is often difficult to determine if the sensors disposed on the vehicles are operating correctly. To determine if the sensors are operating correctly requires a first person bringing an object in proximity to a sensor and a second person viewing the display console inside the vehicle to determine if the sensor is sending a proximity signal to the console.

A third problem with this approach is that such systems generally fail to detect and report the failure of a particular sensor. Thus, it would be desirable to provide a system which detects and indicates the failure of a particular sensor in a plurality of sensors. Furthermore, it would be desirable to have the sensors disposed in a variety of locations on the vehicle.

Moreover, such sensing systems are affected by the weather. Thus it would be desirable to detect the existence of ice and snow, for example, on the sensor and compensate for effects which such weather conditions may have on the sensor.

SUMMARY OF THE INVENTION

In accordance with the present invention, a vehicle sensing system includes a data bus, a first microprocessor coupled to the bus and a plurality of sensor modules coupled to the bus, with each of such sensor modules capable of detecting the presence of objects within a first predetermined distance of the sensor module. Each sensor module includes a transducer, a second microprocessor coupled between the transducer and the bus, for processing information received from the transducer, a light emitting diode coupled to the second microprocessor for providing a visual indication of when an object is within the first predetermined distance of the sensor module or when the sensor module is faulty. The vehicle sensing system further includes a temperature sensing circuit coupled to the second microprocessor and a bus transceiver coupled between the second microprocessor and the bus for receiving information from the bus and for transmitting information to the bus. With this particular arrangement, a vehicle sensing system for use on a motor vehicle, such as a truck for example, is provided. The plurality of sensor modules may be disposed about a vehicle body and a driver alert module display may be coupled to the first microprocessor and disposed on the vehicle such that an operator of the vehicle may view the driver alert module display. The light emitting diode (LED) may be disposed on a first surface of a housing in which the transducer is also disposed. When an object is within the detection range of the sensor module the second microprocessor provides a signal to the LED which causes the LED to illuminate indicating that an object has been detected. When inspecting the sensor module an object may be placed within the detection range of the sensor module. If the sensor module is operating correctly the LED provides a visual indication that the sensor module has detected an object. Thus, the LED provides a visual indication which may be viewed external to the sensor module during inspection and diagnostics of each sensor module of whether the sensor module is operating correctly. Furthermore, by providing such a detection LED, the inspection and diagnostics of the vehicle sensing system may be performed by a single person. Furthermore, by providing each sensor module having the second microprocessor, each sensor module may be programmed to recognize its location on the vehicle and along the bus. Moreover, the microprocessor disposed in each of the sensor modules may be programmed to respond to objects at varying distances from the sensor module. Furthermore, a varying number of sensor modules may be parallel coupled along the bus to provide a vehicle sensing system capable of being disposed on a variety of different motor vehicles, each having a different length. That is the number of sensors may be increased or decreased, as required, depending on the size of the vehicle and the areas around the vehicle within which it is desired to detect objects.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Figure 1:
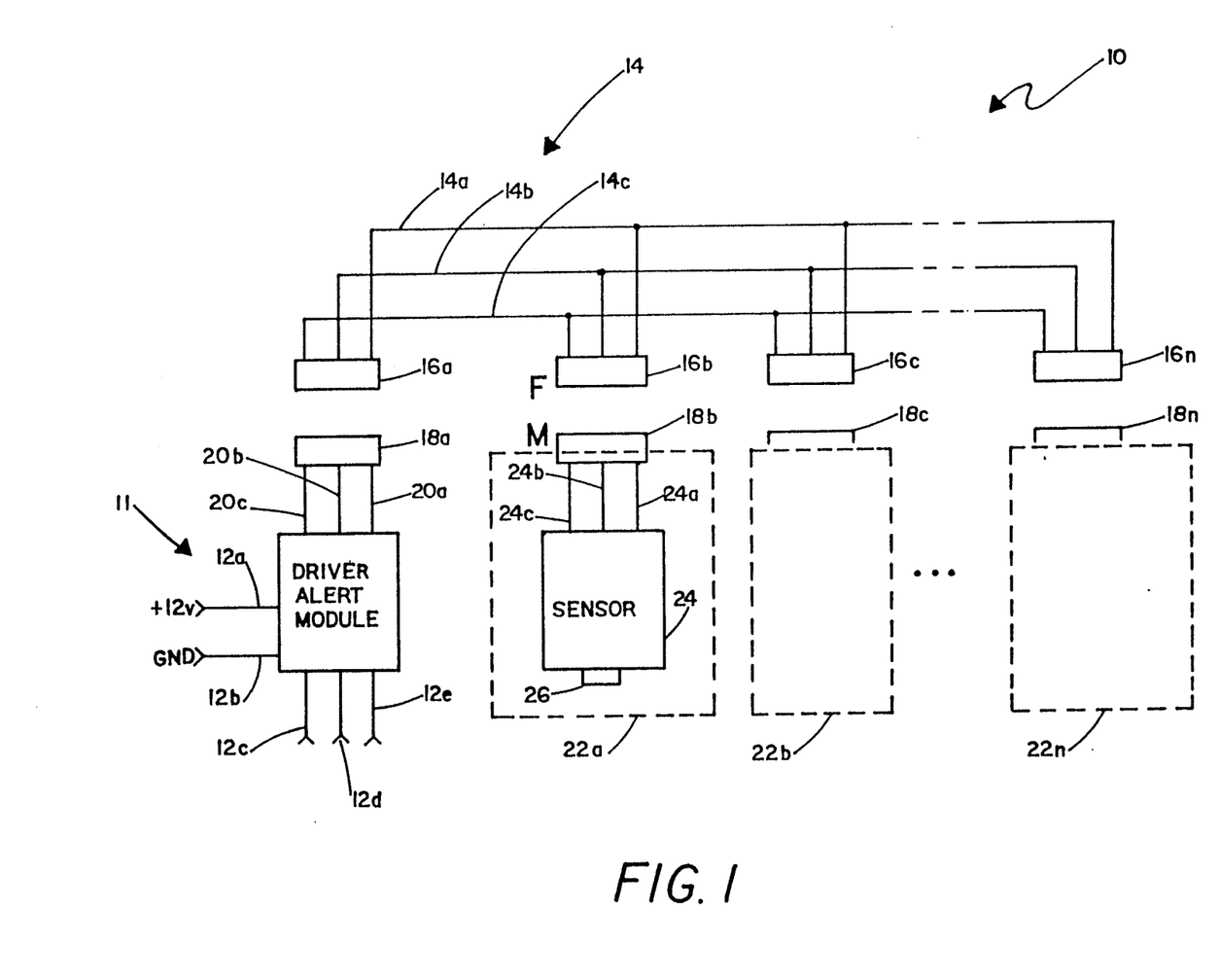
FIG. 1 is a block diagram view of a vehicle sensing system.

Referring now to FIG. 1, a vehicle sensing system 10 includes a driver alert module 11 coupled to a bus, here an asynchronous three-wire data bus 14 which may be of the type, for example, used in a local area network and having the carrier sense multiple access/collision detect (hereinafter CSMA/CD) protocol. Those of skill in the art however will recognize that other network protocols may also be used. The driver alert module 11 provides an interface between an electrical system of a vehicle (not shown) on which the vehicle sensing system 10 is disposed and the vehicle sensing system 10. The driver alert module 11 includes a plurality of input and output terminals 12a-12e generally denoted 12. Terminals 12a and 12b are coupled to first and second reference potentials which may be a positive and a ground terminal of a 12 volt battery, for example. Terminals 12c through 12e may be coupled to left-turn, right-turn and rear-motion signal indicators respectively of the vehicle (not shown) on which the system 10 is disposed. Here a single driver alert module 11 is coupled to the bus 14. Those of skill in the art, however, will recognize that a plurality of driver alert modules 11 may be coupled to the bus 14.

The bus 14 has coupled thereto a plurality of, here female, connectors 16a-16n to which mating, here male, connectors 18a-18n may be connected. Those of skill in the art will recognize that other connector types may also be used. It should also be noted that the bus 14 maybe provided as a plurality of bus sections as will be described in conjunction with FIG. 1A.

Figure 1A:
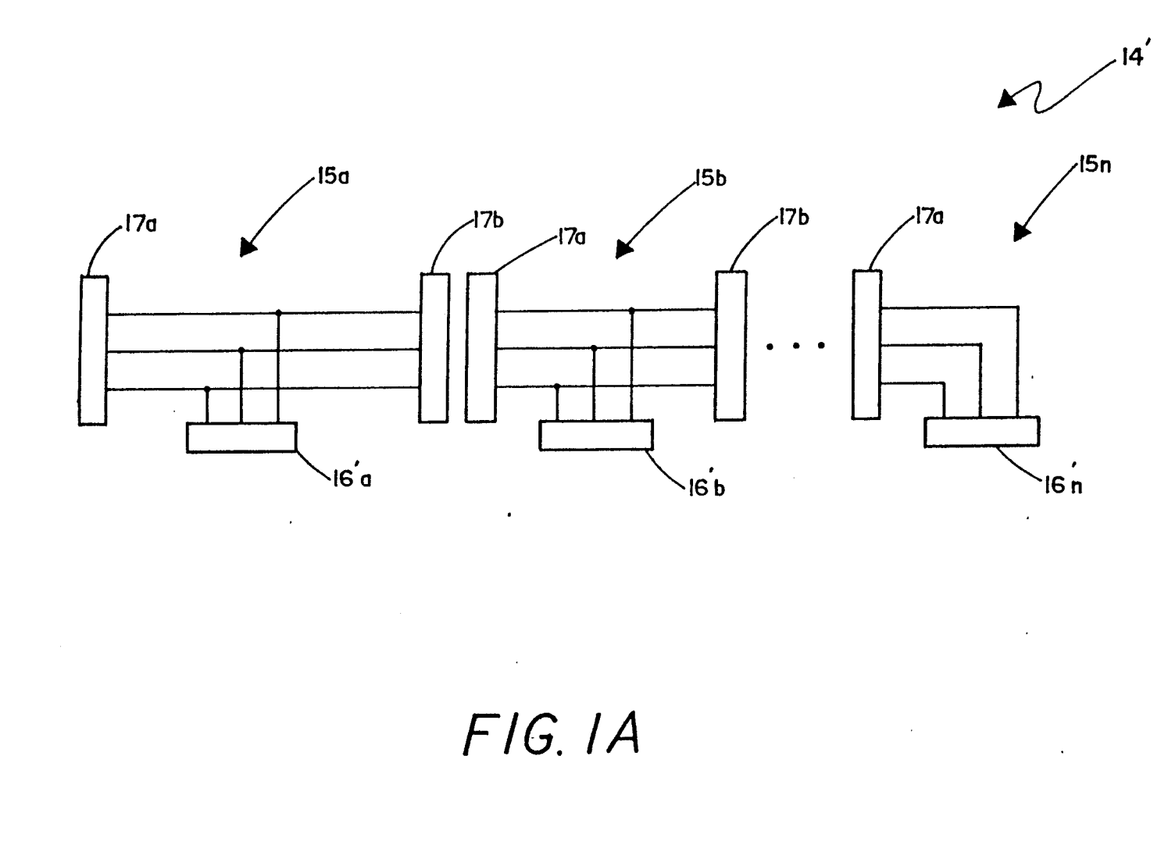
FIG. 1A is a block diagram of a bus which may be used in the vehicle sensing system of FIG. 1.

Referring momentarily to FIG. 1A, a bus 14' may be provided as a plurality of bus sections 15a-15n. Taking bus section 15a as exemplary of bus sections 15a-15n, bus section 15a includes a first bus connector 17a coupled to a first end of the bus section 15a, a second bus connector 17b coupled to a second end of the bus section 15a, and a third bus connector 16a' coupled to the bus section 15a in a region between the first and second bus connectors. A plurality of such bus sections may be coupled with first ones of the bus connectors 17a being coupled to second ones of the second bus connectors 17b to provide the bus 14'. The plurality of sensors 22a-22n (FIG. 1) may be parallel coupled (i.e., daisy-chained) to the bus connectors 16a'-16n'. Here the last bus section 15n includes only the first bus connector 17a and the third bus connector 16n' which may be coupled to a sensor module 22n (FIG. 1) for example. Alternatively, the last bus section 15n may be provided as a 3 connector bus section similar to bus section 15a for example. Those of skill in the art will recognized that bus sections 15a and 15b, for example, may be coupled together via an intermediate bus section (not shown) which simply spaces the bus sections 15a and 15b a predetermined distance apart.

Referring again to FIG. 1, the connectors 16a and 18a here couple a driver alert module 20 to the bus 14. Power signals and data signals are provided to the driver alert module 20 via power line 20a, ground line 20b and data line 20c. The driver alert module 20 will be described further in conjunction with FIG. 2. Suffice it here to say that the driver alert module interfaces with a plurality of sensor modules 22a-22n through the bus 14.

Each sensor module 22a-22n is coupled to the bus 14 via the bus connectors 16b-16n and the mating connector 18b-18n as shown. Also, each sensor module 22a-22n includes a sensor 24 having an external object detection indicator 26, here provided as a light emitting diode, disposed thereon. The light emitting diode 26 indicates when an object is within a first predetermined range of distances of the corresponding sensor 22a-22n.

Taking sensor 22a as representative of sensors 22a-22n, sensor 22a may have a plurality of predetermined range of distances in which it detects objects. Thus, LED 26 may illuminate in a first color, yellow for example, to indicate the presence of an object in a first one of the plurality of predetermined range of distances of sensor 22a. The LED 26 may also illuminate in a second color, red for example, to indicate the presence of an object in a second different one of the plurality of predetermined range of distances of the sensor 22a. Thus LED 26 may be provided as an LED assembly disposed in a single LED housing (not shown). LED assemblies which emit two or more different colors of light are commercially available and well known to those of skill in the art.

Furthermore, the LED 26 may indicate, by flashing for example, when the corresponding sensor 22a-22n is faulty as will be described further in conjunction with FIG. 3.

It should be noted that the present bus structure 14 or 14' (FIG. 1A) is capable of supporting a combination of sensors 22a-22n and driver alert modules 11 totalling two hundred and fifty-six. For example, one driver alert module and two hundred fifty-five sensors may be coupled to the bus 14. Alternatively two driver alert modules and two hundred and fifty-four sensors may be coupled to the bus 14. Other combinations of driver alert and sensor modules may also be used. Other bus structures may, of course, be capable of supporting more than a total two hundred and fifty-six sensors and driver alert modules.

Figure 2:
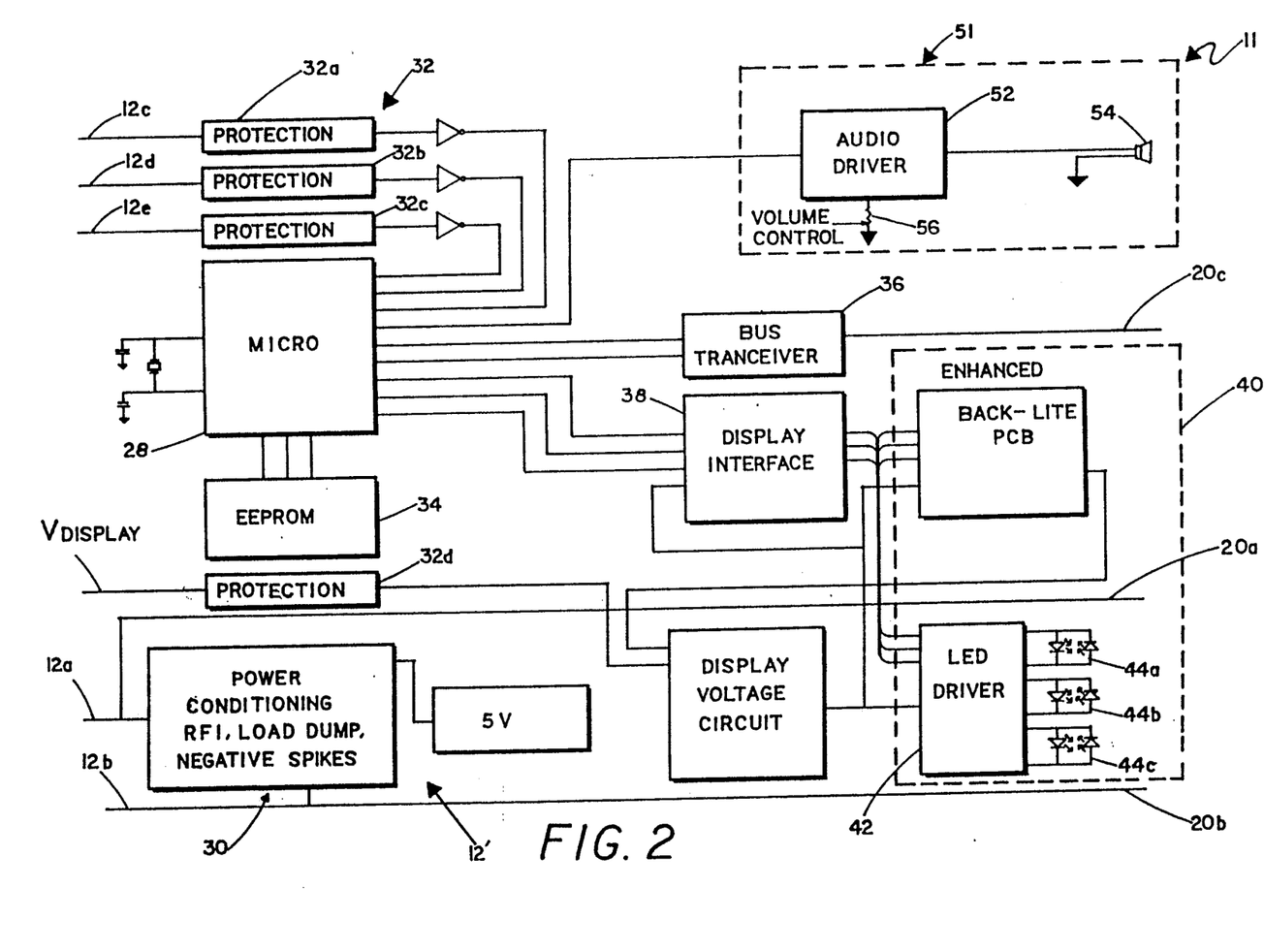
FIG. 2 is a block diagram view of a driver alert module.

Referring now to FIG. 2 in which like elements of the driver alert module 11 of FIG. 1 are provided having like designations, the driver alert module 11 having the input and output terminals 12a-12e described above in conjunction with FIG. 1 is shown to include a microprocessor 28.

The driver alert module 11 further includes a power conditioning circuit 30 and a plurality of protection circuits 32a-32d which protect voltage sensitive circuit elements such as the microprocessor 28, for example, from signals having voltage levels capable of damaging such voltage sensitive circuit elements.

The microprocessor 28 is coupled to a memory 34, here an electrically, erasable, programmable read only memory (EEPROM). The microprocessor 28 is further coupled to a bus transceiver 36 which is coupled to the data line 14c of the bus 14 via the terminal 20c. The microprocessor 28 is also coupled to a display interface 38 and provides clock, data and load signals thereto.

The display interface 38 is coupled to a display 40 which includes a photo-cell (not shown) coupled to an LED driver circuit 42. The LED driver circuit 42 is coupled to here three LEDs generally denoted 44. In normal operation a first LED 44a emits a green light to indicate the sensor modules 22a-22n (FIG. 1) are operating within their normal parameters. If one of the operating parameters of a sensor module is not within the normal operating parameters however then the LED 44a emits a red rather than green light. Thus the color of the light emitted by LED 44a may change in response to diagnostics performed by one or all of the sensors 22a-22n (FIG. 1).

Similarly, in normal operation a second LED 44b emits a green light to indicate the driver alert module 11 (FIG. 1) is operating within its normal parameters and is properly coupled to the bus 14 (FIG. 1). If one of the operating parameters of the driver alert module 11 is not within the normal operating parameters however then the LED 44b emits a red rather than green light to indicate the existence of a problem in the driver alert module 11.

A third LED 44c emits a light when any one of the plurality of proximity sensors 22a-22n detect an object within a first predetermined distance.

The photo-cell is here used to adjust the brightness of the LEDs to in response to the surrounding light.

Figure 2A:
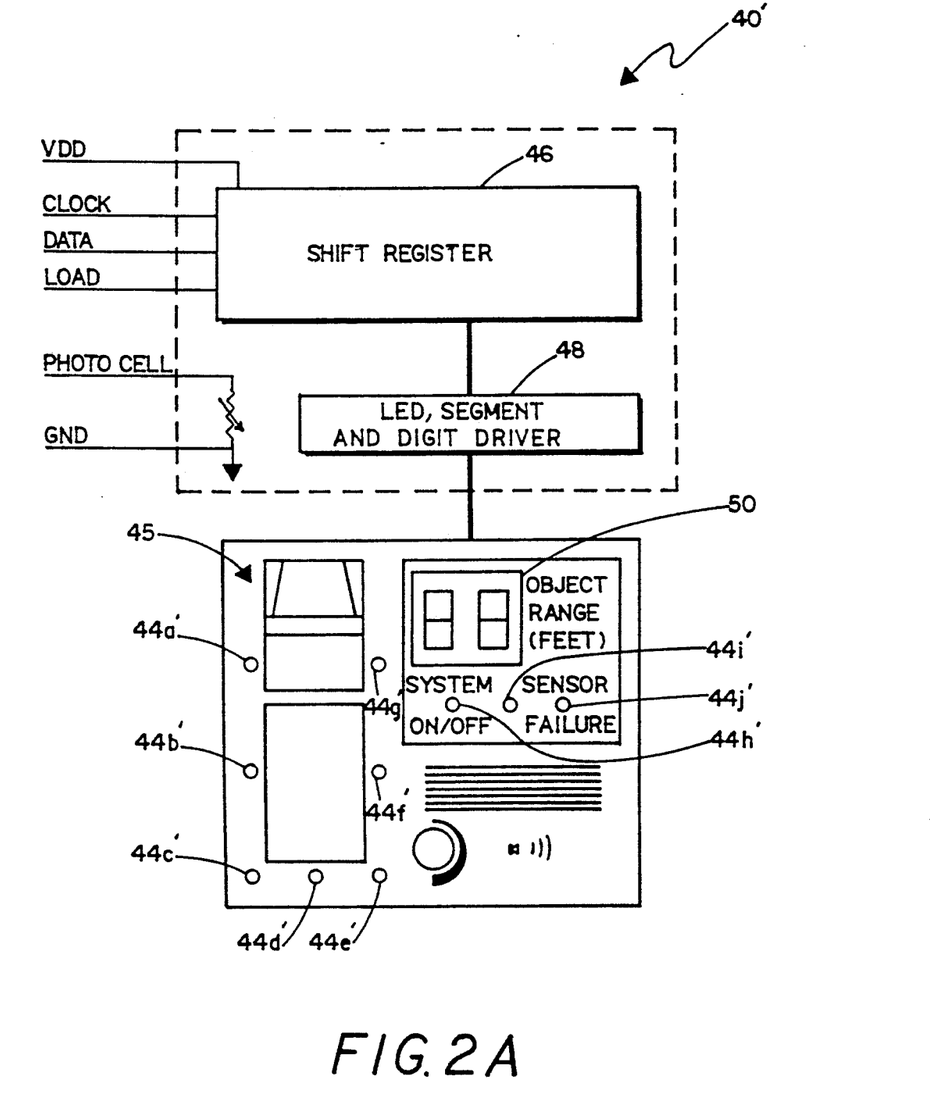
FIG. 2A is a block diagram view of an enhanced display module which may be used in the driver alert module of FIG. 2.

Referring momentarily to FIG. 2A, an enhanced display module 40' is shown to include here a shift register 46 and an LED segment and digit driver 48 coupled to a dual seven segment display 50 to indicate a distance to a detected object. Alternatively any means well known to those of skill in the art (e.g. a direct connection, etc . . . ) may be used to provide data from the microprocessor 28 (FIG. 2) to the LED segment digit driver 48.

A plurality of LEDs 44a'-44g' generally denoted 44' are disposed about a diagrammatical view of the vehicle 45, here a truck for example, on which the sensor modules 22a-22n (FIG. 1) are disposed. The number of LEDs 44' need not have a one to one correspondence with the number of sensors 22 (FIG. 1) disposed on the vehicle. Thus either more or fewer sensors than LEDs may be disposed to provide the vehicle sensing system 10 (FIG. 1).

If the number of LEDs 44' does not correspond to the number of sensors 22 (FIG. 1) disposed on the bus 14 (FIG. 1) then microprocessor 28 performs the processing required to determine which particular LED 44' will be illuminated.

In operation when an object enters the detection zone of each of the sensors 22a-22n the corresponding LED 44a'-44g' emits a light. The LED 44' representative of the sensor 22a-22n (FIG. 1) to which the object is closest will blink and the distance between the object and that particular sensor will be displayed on the dual seven segment display 50. Thus, the range displayed on the seven segment display 50 will correspond to the zone of the particular LED 44a'-44g' to which the object (not shown) is closest.

First and second LED's 44h', 44i' illuminate to indicate when the vehicle sensing system 10 (FIG. 1) is on or off. A third LED 44j' is automatically illuminated to indicate to an operator of the vehicle the failure of one of the sensors 22a-22n (FIG. 1).

The driver alert module 11 further includes an audio circuit 51 coupled to the microprocessor 28. The audio circuit 51 includes an audio driver circuit 52 coupled between the microprocessor 28 and a speaker 54. The audio circuit 51 provides an audio tone to indicate a failure in one of the sensor modules 22a-22n (FIG. 1) or a failure in the driver alert module 11 (FIG. 1). A volume control circuit 56 here provided as a variable resistor provides volume control to the speaker 54.

Furthermore, the microprocessor 28 may be programmed such that, in response to an object entering a predetermined distance of one of the sensors 22a-22n (FIG. 1), the microprocessor 28 provides a signal to the audio driver circuit 52 and generates an audio signal via the speaker 54. Thus the vehicle sensing system 10 actively alerts the user of the system 10 of the existence of a proximate object. Passive systems, on the other hand, require the operator to continuously monitor and interrogate such systems for information on proximate objects.

Figure 3:
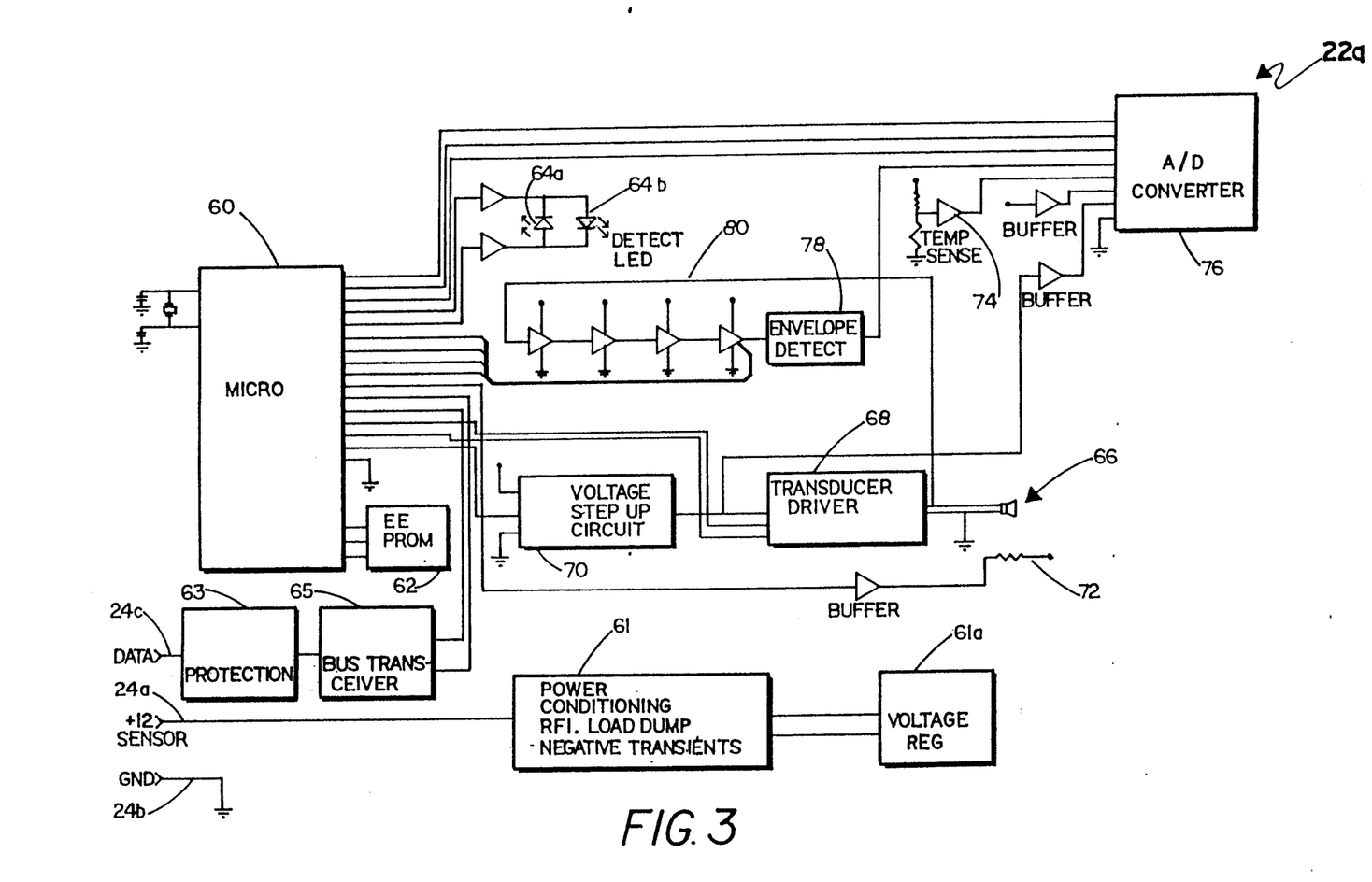
FIG. 3 is a block diagram of a sensor which may be used in the vehicle sensing system of FIG. 1.

Referring now to FIG. 3, the sensor module 22a (FIG. 1) includes a microprocessor 60 coupled to a memory 62, here an electrically erasable programmable read only memory (EEPROM). The microprocessor 60 is also coupled to a pair of detector LEDs 64a, 64b, here, a first one 64a of said pair being red and a second one 64b of said pair being yellow.

The LED's 64a, 64b provide the external object detection indicator 26 (FIG. 1). Here the red LED 64a which is visible external to the sensor 24, is coupled to the microprocessor and indicates when an object is detected in a first selected active range of detection. The yellow LED 64b emits a yellow light when an object is detected in a second selected active range of detection. This permits the operator of a vehicle on which the vehicle sensing system 10 (FIG. 1) is disposed to isolate faulty sensors. For example, constant flashing of the red LED 64a may indicate the existence of a single faulty sensor module in a plurality of sensor modules 22a-22n (FIG. 1).

The LEDs 64a, 64b and transducer are disposed on a first external surface of a housing inside which the microprocessor 60 and other electronics, to be descrbed below, which provide the sensor module 22a are disposed.

The sensor module 22a includes a power conditioning circuit 61 coupled to the power line 14a of the bus 14 (FIG. 1) via the line 24a. A voltage regulator circuit 61a provides regulated voltage to other circuit elements of the sensor module 22a.

The sensor module 22a also includes a bus transceiver 65 coupled between a data terminal 24c and the microprocessor 60. The bus transceiver 65 transmits and receives signals between the microprocessor 60 and the data line 14c of the bus 14 (FIG. 1). A protection circuit 63 is disposed between the terminal 24c and the bus transceiver 65 to protect the bus transceiver 65 and microprocessor 60 from signals on the data line 14c (FIG. 1) having voltage levels which may damage either the microprocessor 60 or the bus transceiver 65.

A transducer 66, here provided as an ultrasonic transducer but alternatively provided as an infrared transducer, for example, is coupled to a transducer driver 68. The transducer driver 68 is coupled to the microprocessor 60 and a voltage step-up circuit 70. The voltage step-up circuit 70 provides the requisite voltage needed to drive the particular type of transducer 66 coupled thereto. Here, a heating element 72 is disposed near the ultrasonic transducer 66 to maintain a predetermined range of temperatures on the transducer 66. A temperature sensing circuit 74 is here coupled to an analog to digital converter 76 (hereinafter ADC) which is coupled to the microprocessor 60. The temperature sensing circuit 74 monitors ambient temperature about the sensor 24 and provides such information to the ADC 76 and consequently to the microprocessor 60. The microprocessor 60 controls the heating temperature of the heater 72 and thus provides the transducer 66 having a surface temperature above freezing to prevent ice and snow, for example, from accumulating on the transducer 66.

The transducer 66 is also coupled to an envelope detector 78 and a gain circuit 80. The gain circuit 80 provides amplified signals to the microprocessor 60. The envelope detector 78 provides signals to the ADC 76 which receives the analog signals fed thereto and provides a digital representation of such signals to the microprocessor 60. The microprocessor 60 may adjust the frequency, amplitude and gain characteristics of the transmitted signal to improve the received signal characteristic and provide optimum sensor module performance (e.g., reduce number of false alarms, etc. . . . ) Thus, the microprocessor 60 disposed in each sensor module 22a–22n improves the real time processing of the transmit and receive signal pulses and thereby improves the performance of the sensor module 22a.

The microprocessor 60 is also programmed to provide a plurality of detection levels. For example, the microprocessor 60 may provide continuous acquisition of objects and resultant range information. Furthermore, the microprocessor 60 may provide a continuous evaluation of the performance of the sensor module 22a and detect and report failures which occur within the sensor module 22a.

The microprocessor 60 is also programmed to determine the maximum detection range and the address identification, i.e., bus address, of the sensor module 22a. Thus, each sensor module 22a–22n (FIG. 1) may be disposed in a particular location on the vehicle and have its own particular detection range or ranges. That is, each sensor module 22a–22n (FIG. 1) may have a first detection range of fifteen feet for example and a second detection range of ten feet for example. Thus, as described above in conjunction with FIG. 1, LED 26 may emit a yellow light when an object is within 15 feet of the corresponding sensor module and the LED 26 may emit a red light when the object is within 10 feet of the sensor module.

The microprocessor 60 may operate in a stand-alone mode for applications that only require object detection (e.g., discriminating alarms, door opening, etc. . . . ) The microprocessor 60 may also be programmed to provide continuous or synchronized modes for the parallel sensor modules 22a–22n. Furthermore, the microprocessor 60 determines the object proximity required prior to alarm output and provides the upper pulse duration and signature as well as the minimum detection threshold. Thus, the sensor module 22a is a stand-alone object detection module.

The three wire connection to the bus 14 (FIG. 1) via the connectors 18b–18n permits relatively easy replacement of a damaged or faulty sensor module 22a–22n. Thus, a damaged or inoperative sensor module may simply be "unplugged" from the bus 14 and in replacement thereof a properly operating sensor module may be "plugged in" to the bus 14.

Figure 4:
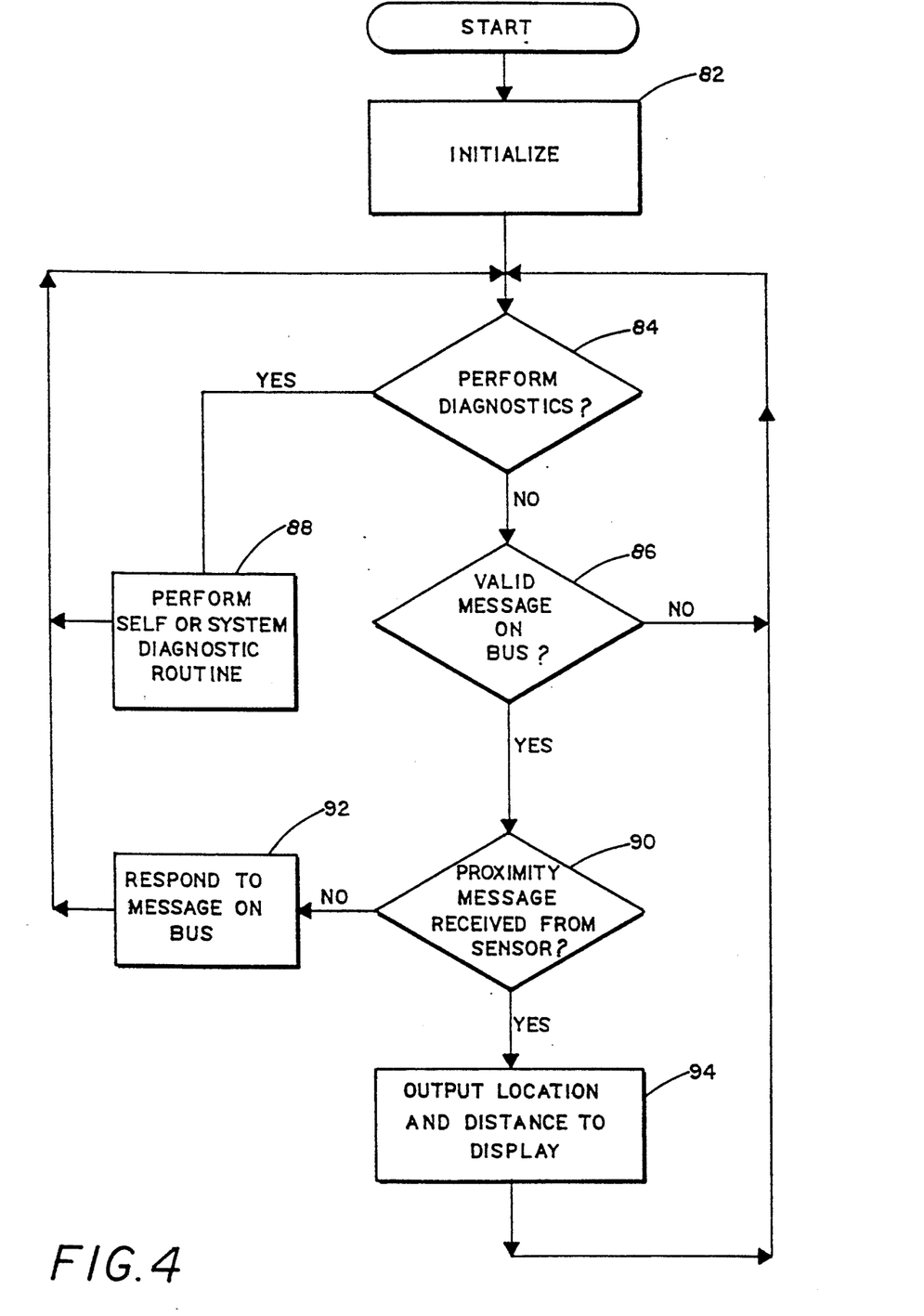
FIG. 4 is an exemplary flow diagram of processing steps which may be performed by the microprocessor in the driver alert module of FIG. 2.

FIG. 4 shows a flow diagram of the processing performed in the microprocessor 28 (FIG. 2) of the driver alert module 11 (FIG. 2) to produce an output on the display (40 FIG. 2 or 40' FIG. 2A).

In the flow diagram, the rectangular elements (typified by element 82) herein denoted "processing blocks" represent computer software instructions or groups of instructions. The diamond shaped elements (typified by element 84) herein denoted "decision blocks" represent computer software instructions or groups of instructions which affect the execution of the computer software instructions represented by the processing blocks. The flow diagram does not depict syntax or any particular computer programming language. Rather, the flow diagram illustrates the functional information one skilled in the art requires to generate computer software to perform the processing required of driver alert module 20'. It should be noted that many routine program elements such as initialization of loops and variables and the use of temporary variables are not shown.

As can be seen in FIG. 1 the driver alert module 11 is coupled to the bus 14 and monitors the signals which appear on the bus 14. At the start of the processing shown in FIG. 4, a plurality of sensor modules 22a–22n (FIG. 1) are coupled to the bus 14.

Turning now to FIG. 4, processing block 82 performs an initialization procedure in which the driver alert module 11, for example, detects the presence of each sensor module 22a–22n on the bus 14 and creates a "list" of active sensor modules. Furthermore, the microprocessor 28 will ascertain the parameters of each sensor module 22a–22n and include such parameters in its list of active sensor modules. Parameters of the sensor modules 22a–22n may include but are not limited to sonar frequency, sonar pulse duration, sonar pulse amplitude, sonar pulse transmit voltage drain, positional identification, unique identification number, distance warning range and distance alert for example.

The driver alert module 11 will detect the presence of a sensor module 22a–22n which has not previously been "logged on" and will detect the addition of new sensor modules and their parameters and include the information in the list of active sensor modules. When a signal on the bus 14 indicates a simultaneous loss of all trailer resident sensor modules and the reinstatement of sensor modules with differing unique identification addresses, the driver alert module 11 assumes a trailer detached and reconnect has occurred and resets the list of active sensor modules 22a–22n without operator intervention.

Each driver alert module and each sensor module has a first unique identification code. This allows the cab containing the driver alert module and the trailer equipped with sensor modules to be uniquely identified. This information may be used, for example, to allow automated systems to make certain that predetermined trailers are connected to corresponding predetermined cabs and assigned to a corresponding predetermined driver. Each sensor module 22a–22n has a second unique identification code which corresponds to the location at which the sensor is disposed.

Decision block 84 determines whether self or system diagnostics should be performed. That is, each sensor module 22a–22n may independently decide to run diagnostic tests on itself. Furthermore all or a particular one of the driver alert modules 22a–22n may receive a message on the bus from the driver alert module or other device coupled to the bus, for example, which prompts the sensor module to perform a diagnostic self test or system test.

If a decision is made in decision block 84 to perform the diagnostics then either the self or system diagnostic routine may be performed as shown in processing block 88. If a decision is made not to perform diagnostics then processing continues at decision block 86.

Decision block 86, implements a loop wherein the driver alert module 11 monitors the bus 14 and determines if a valid message signal is on the bus 14. The source of the signal may be from one of a plurality of sources including but not limited to any one of the sensor modules 22a–22n. For example, the source of the signal may be a directional indicator of the cab (e.g., to indicate the vehicle will turn), a reverse signal from the cab (e.g. to indicate the vehicle will back up) or the like. For example, the driver alert module may modify the signal provided to the audio driver 52 in the driver alert module 11 or retrieve data from the EEPROM 34. Alternatively, the driver alert module may provide a signal to the bus which commands the sensor to perform diagnostics.

If the received signal is not a request to perform diagnostics then decision block 90 determines if the message is a proximity message being sent from one of the plurality of sensor modules 22a–22n. If the signal is not a proximity signal, the driver alert module 11 provides an appropriate response to the signal as shown in processing block 92. For example the driver alert module may modify the signal provided to the audio driver circuit 52 or retrieve data from the EEPROM 34. Alternatively, the driver alert module may provide a signal to the bus which commands the sensor to perform diagnostics.

As shown in decision block 94, if the signal is a proximity signal received from one of the sensors 22a–22n, the microprocessor 28 provides the appropriate signal to the display which is coupled thereto.

For example, if the enhanced display 40' (FIG. 2A) is coupled to the driver alert module 11, the microprocessor 28 provides to the display 40' both the location of the sensor 22a–22n and the distance between the sensor and the detected object as shown in processing block 94. Thus, the driver alert module 11 examines the sender (i.e., the particular sensor module) of the proximity message to determine the physical location of the sensor. The microprocessor 28 then determines the data to be displayed based upon the type of display mechanism provided in the driver alert module. The enhanced driver alert module display 40' (FIG. 2A) provides the ability to indicate seven zones around a vehicle. The color, position, and flash rate of the LEDs 44a–44g' also convey information on the severity of the warning and the status of the individual sensors 22a–22n. Processing then continues at decision block 84 as described hereinabove.

The driver alert module 11 may also operate in a programming mode wherein the microprocessor 28 may modify one or several parameters of a particular one or of all of the sensors. This mode may be activated, for example, by providing power to the driver alert module 11 and within ten seconds indicating three right turns followed by three left turns. Thereafter, the left turn signal, the right turn signal, and the reverse selection signal are used to select, for example, the sensor of interest, the parameter to modify, (e.g., threshold, position identification, etc.) and sets of parameter values. The programming mode of operation may, of course, be entered into at any time during the processing steps described hereinabove in conjunction with FIG. 4. Other schemes to enter the programming mode or a diagnostic mode, for example, may also be used.

Figure 5:
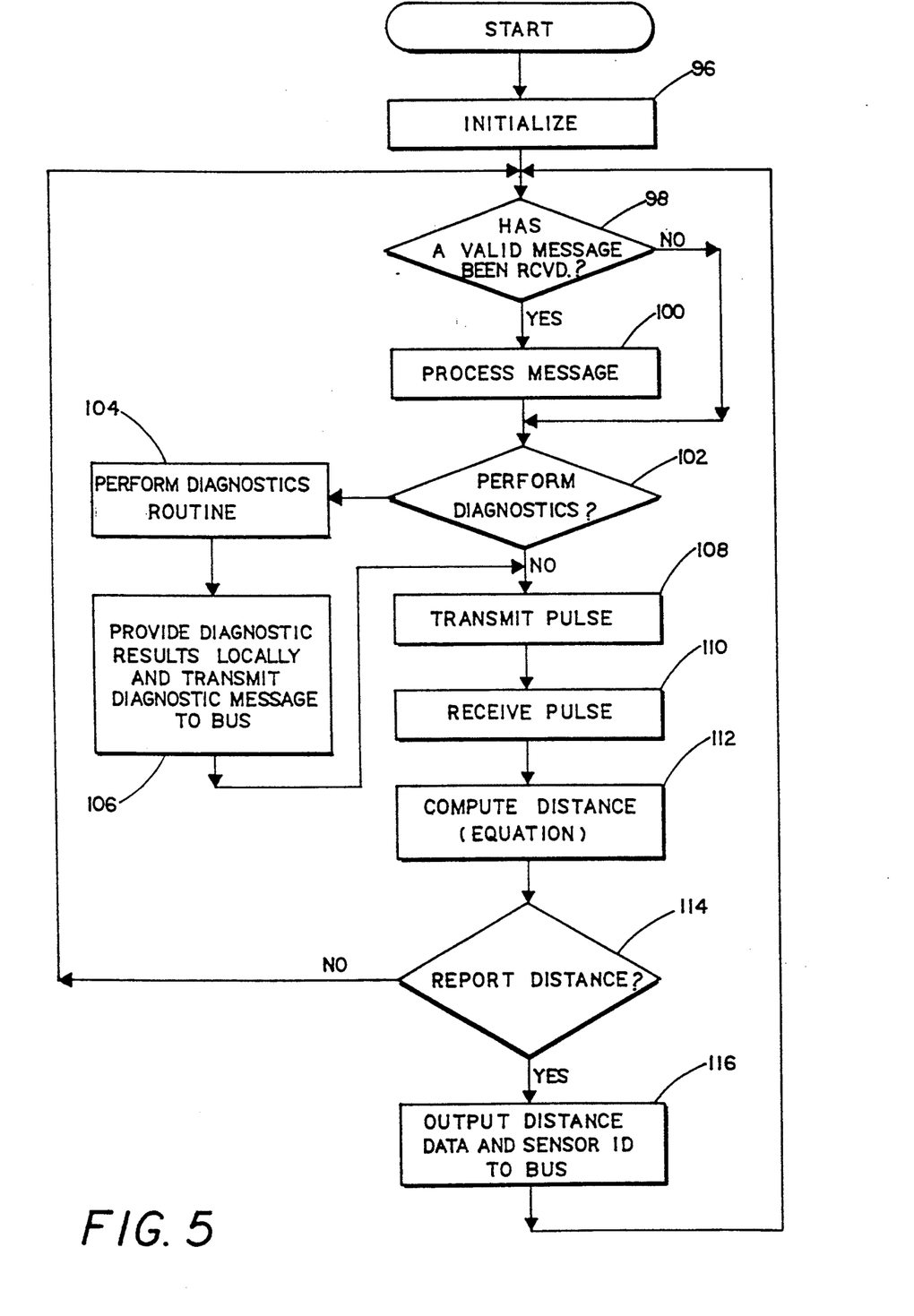
FIG. 5 is an exemplary flow diagram of the processing steps which may be performed by the microprocessor in the sensor of FIG. 3.

Referring now to FIG. 5 a flow diagram of the processing performed in the sensor module 22a (FIG. 1) to provide information to the bus 14 (FIG. 1) is shown. Processing block 96 includes an initialization process in which the sensor module 22a may "log on" to the bus 14 and provide to the driver alert module 11 data corresponding to presence, location and unique identification number of the sensor module 22a. Alternatively and or in addition to the sensor "logging on" the driver alert module 11 (FIG. 1) periodically requests identification information from devices, such as the sensors 22a–22n (FIG. 1) for example, coupled to the bus 14.

Furthermore, the driver alert module 11 may inspect or modify parameters which are stored in the memory 62 (FIG. 3) of the sensor module 22a including but not limited to sonar frequency, sonar pulse duration, sonar pulse amplitude, sonar pulse transmit voltage drain, positional identification, unique identification number, distance warning range and distance alert range.

In decision block 98 the sensor module determines if it has received a valid message signal on the bus 14.

If a valid signal is received then sensor module 22a processes the message as shown in processing block 100. If the message signal is not valid then decision block 98 skips processing block 100 and processing continues at decision block 102.

In decision block 102 the sensor module 22a may perform self-diagnostics. If it is desirable to perform such diagnostics, then the sensor module 22a runs a diagnostic subroutine as shown in processing block 104. After completion of the diagnostics routine the result of the diagnostic tests may be reported both locally to the sensor module itself and the diagnostic results may also be transmitted to the bus in the form of a diagnostic message signal. Regardless of whether diagnostics are performed, the sensor module 22a proceeds into its detection mode.

In its detection mode, as shown in processing block 108, a signal pulse is transmitted from the sensor module 22a via the transducer 66 (FIG. 3).

Processing block 110 receives a return pulse and processing block 112 computes the distance of the object nearest to the proximity sensor. Distance is sensed by first developing a varying voltage electrical signal which is converted into a sound pulse of a given frequency and duration. Next the sensor measures the time it takes for the transmitted signal pulse to return as an echo signal. The voltage step up circuit 70 (FIG. 3) allows the voltage level of the transmitted signal pulse to be varied to accommodate various types of electrical to sound transducers which may be used in the sensor module 22a. Furthermore, the detection circuit 78 (FIG. 3) measures the voltage level of the transmitted pulse to determine if the proper voltage has been generated and transmitted. The microprocessor 60 in the sensor module 22a provides a means for varying the frequency of the transmitted pulse to thus accommodate various types of electrical to sound transducers which may be disposed in the sensor.

Since the speed of sound varies in proportion to the ambient temperature, the temperature sensor data is used in the calculations which convert the measured time data to a corresponding distance.

The microprocessor 60 may vary the repetition rate of the transmitted sound pulse in a random fashion to minimize interference with other like sensor modules. Thus, the sensor module 22a is frequency agile, transmit power agile, and receive sensitivity agile. This technique allows ranging the above-mentioned parameters in response to surrounding environmental or other conditions, for example, to maximize the number of valid signals and minimize the number of erroneous responses (i.e., false alarms).

Decision block 114 determines if the distance computed in processing block 112 should be reported to the bus 14. The microprocessor 60 selectively decides to report a distance based on a minimum threshold per sensor module. If the minimum threshold per sensor module is not met then processing loops to the decision block 98 where diagnostics may again be performed. If the reporting distance is met (i.e., if the distance between the detected object and the sensor module 22a is within a first predetermined range of distances), then processing continues to processing block 116 where the output distance data and the sensor identification are output to the bus 14 to be received by the driver alert module 11 as described hereinabove in conjunction with FIG. 4.

It should be noted in the above description that the microprocessors 28 and 60 are preferably provided having multi-tasking operating systems. Thus, many of the above-described steps may be performed simultaneously. For example, the driver alert module 11 may simultaneously monitor the bus activity, send and receive messages as required and perform any required computations. Similarly, the sensor module 22a may, for example, simultaneously monitor the bus 14 and perform the required computations to compute the distance between the module 22a and a detected object.

Figure 6:
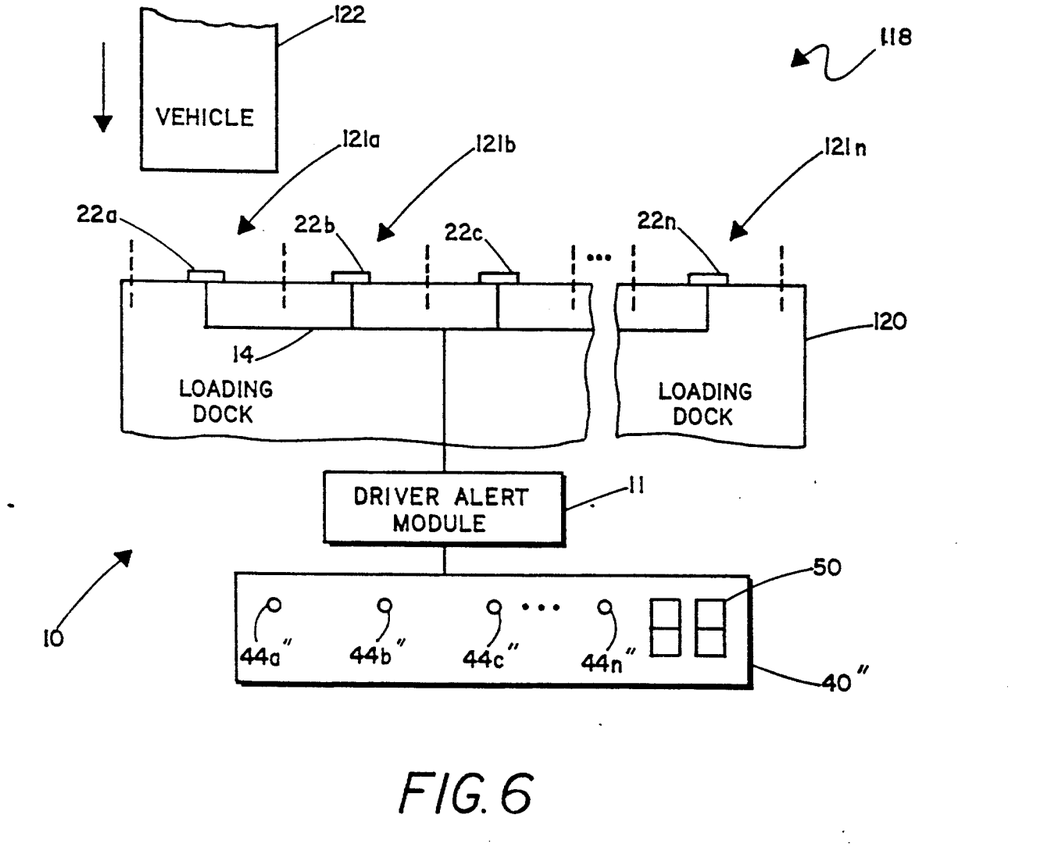
FIG. 6 is a block diagram of a sensor system disposed on a loading dock.

Referring now to FIG. 6 the vehicle sensing system 10 (FIG. 1) is shown disposed on a stationary object, here a loading dock 120 having a plurality of loading bays 121a-121n. In this embodiment, the vehicle sensing system 10 detects objects moving in relation to the loading dock 120. Here, a portion of a vehicle 122 is shown moving in the direction of the loading dock. The sensor module 22a is disposed along the edge of the loading bay 121a and detects the movement of the vehicle 122. Sensor 22a provides the information along the bus 14 to the driver alert module 11 which may be located for example in office of the truck dispatcher along with an appropriate display 40" coupled thereto. Here, the display 40" may provide an indication via a corresponding LED 44a"-44n" of which loading bays 122a-122n have objects within the detection range of the corresponding sensors 22a-22n. Alternatively and or in addition to the visual indicator provided by the LEDs 44a"-44n", an audio signal may be provided as to indicate movement as described hereinabove in conjunction with FIG. 2. Thus, a truck dispatcher may monitor movement of vehicles or other objects moving in the proximity of the loading bays 121a-121n of the loading dock 120.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

What is claimed is:

1. A sensor comprising:
 a transducer;
 a microprocessor coupled to said transducer for processing information received from said transducer;
 a light emitting diode coupled to said microprocessor, for indicating a first one of the following conditions:
 (a) when an object is within a first one of a plurality of predetermined range of distances of said sensor; or
 (b) when said sensor is faulty; and
 a temperature sensing circuit coupled to said microprocessor.

2. The sensor of claim 1 wherein:
 said transducer comprises:
 (a) an ultrasonic transducer;
 (b) a transducer driver coupled between said microprocessor and said ultrasonic transducer; and
 said microprocessor selectively determines each of said plurality of predetermined range of distances.

3. The sensor of claim 2 further comprising a bus transceiver, coupled between a data port of said sensor and the microprocessor, for receiving information fed to said data port and for transmitting information from said microprocessor to said data port.

4. The sensor of claim 3 further comprising a memory coupled to the microprocessor for holding an identification code of said sensor.

5. The sensor of claim 4 wherein said memory is an electrically erasable programmable read only memory.

6. The sensor of claim 5 further comprising an analog to digital converter coupled between said transducer and said microprocessor for receiving analog voltage signals from said transducer and providing digital voltage signals to said microprocessor and wherein said microprocessor is capable of performing diagnostics on said sensor.

7. A vehicle sensing system comprising:
 a bus;
 a first microprocessor coupled to said bus; and
 a plurality of sensors, for sensing objects within a first one of a plurality of predetermined range of distances of said sensor and with each sensor comprising:
 (a) a transducer;
 (b) a second microprocessor, coupled between said transducer and said bus, for processing information received from said transducer;
 (c) a light emitting diode coupled to said microprocessor, for indicating a first one of the following conditions:
 (i) when an object is within a first predetermined range of distances of said sensor; or
 (ii) when said sensor is faulty;
 (d) a temperature sensing circuit coupled to said microprocessor; and
 (e) a bus transceiver for receiving information from said bus and for transmitting information to said bus.

8. The vehicle sensing system of claim 7 further comprising:
 a display coupled to said first microprocessor; and
 a first memory coupled to said first microprocessor.

9. The vehicle sensing system of claim 8 wherein each of said sensors comprises a second memory coupled to the second microprocessor for holding an identification code of said sensor and wherein each sensor has a unique identification code.

10. The vehicle sensing system of claim 9 wherein said second memory is an electrically erasable programmable read only memory.

11. The vehicle sensing system of claim 10 wherein said transducer comprises:
   (a) an ultrasonic transducer;
   (b) a transducer driver coupled between said second
   microprocessor and said ultrasonic transducer; and
   said second microprocessor selectively determines said first predetermined range of distances.

12. The vehicle sensing system of claim 11 further comprising an analog to digital converter, having a first port coupled to said transducer and having a second port coupled to said second microprocessor, for receiving analog voltage signals from said transducer and providing digital voltage signals to said second microprocessor.

13. The vehicle sensing system of claim 12 further comprising:
   a display coupled to the first microprocessor wherein said display comprises:
      (a) means for providing an audio signal to indicate the proximity of an object to at least one of said plurality of sensors;
      (b) means for providing a visual indication to indicate the proximity of an object to at least one of said plurality of sensors; and
      (c) means for indicating a sensor failure.

14. The vehicle sensing system of claim 13 wherein said bus is a three wire bus and comprises a plurality of bus sections with each bus section comprising:
   (a) a first bus connector coupled to a first end of said bus section
   (b) a second bus connector coupled to a second end of said bus section; and
   (c) a third bus connector coupled to said bus section in a region between said first and second connectors;
   wherein first ones of said first bus connectors are coupled to first ones of said second bus connectors to provide a harness; and
   wherein each of said plurality of sensors are parallel coupled to a corresponding one of said plurality of third bus connectors.

15. The vehicle sensing system of claim 14 wherein:
   said means for providing an audio signal comprises a speaker;
   said means for providing a visual indication comprises an alphanumeric display; and
   said means for indicating a sensor failure comprises at least one light emitting diode.

16. The vehicle sensing system of claim 15 wherein:
   said means for providing an audio signal comprises a digital tone generator;
   said means for providing a visual indication comprises:
      (a) a light emitting diode display; and
      (b) an ambient light sensor for monitoring the ambient light and adjusting the brightness of the display; and said means for indicating a sensor failure comprises a speaker.

17. The vehicle sensing system of claim 16 wherein said bus is a three wire bus and comprises a plurality of bus sections with each bus section comprising:
   (a) a first bus connector coupled to a first end of said bus section
   (b) a second bus connector coupled to a second end of said bus section; and
   (c) a third bus connector coupled to said bus section in a region between said first and second connectors;
   wherein first ones of said first bus connectors are coupled to first ones of said second bus connectors to provide a harness; and
   wherein each of said plurality of sensors are parallel coupled to a corresponding one of said plurality of third bus connectors.

18. A vehicle sensing system comprising:
   a sensor bus comprising:
      (a) a plurality of bus sections with each bus section comprising:
         (i) a first connector coupled to a first end of said bus section;
         (ii) a second connector coupled to a second end of said bus section; and
         (iii) a third connector coupled to said bus section in a region between said first and second connectors;
   a driver alert module coupled to said first connector of said sensor bus with said driver alert module comprising:
      (a) a first microprocessor coupled to said sensor bus; and
      (b) a display coupled to said first microprocessor; and
   at least one sensor module, coupled to said third connector of said sensor bus, for sensing objects within a first one of a plurality of predetermined range of distances of said sensor module and with each sensor module comprising:
      (a) a transducer;
      (b) a second microprocessor coupled to said transducer for processing information received from said transducer;
      (c) a light emitting diode disposed on a first surface of the transducer, coupled to said second microprocessor, for emitting a light in response to a first one of the following conditions:
         (i) when an object is within a first one of a plurality of predetermined range of distances of said sensor module; or
         (ii) when said sensor module is faulty;
      (d) a temperature sensing circuit coupled to said second microprocessor; and
      (e) a bus transceiver for receiving information from said bus and for transmitting information to said bus.

19. The vehicle sensing system of claim 18 wherein:
   said driver alert module is a first one of a plurality of driver alert modules with each of said driver alert modules being parallel coupled to one of said plurality of third sensor bus connectors disposed on the corresponding sensor bus section between the corresponding first and second sensor bus connectors; and
   said sensor module is a first sensor module of a plurality of sensor modules with each of said plurality of sensor modules being parallel coupled to one of said plurality of third sensor bus connectors with each of said third sensor bus connectors disposed on the corresponding sensor bus section between the corresponding first and second sensor bus connectors.

20. The vehicle sensing system of claim 19 wherein:

each of said driver alert modules further comprise a first electrically erasable programmable read only memory coupled to said first microprocessor; and each of said plurality of sensor modules further comprise a second electrically erasable programmable read only memory coupled to said second microprocessor.

21. The vehicle sensing system of claim 20 wherein each of said plurality of sensor modules are disposed on an external surface of a vehicle.

22. The vehicle sensing system of claim 20 wherein each of said plurality of sensor modules are disposed on a stationary platform.

23. A method of sensing an object comprising the steps of:
    transmitting a first signal from a transducer;
    receiving a return signal in a transducer;
    computing in a first microprocessor, from said transmit and receive signals, a distance to an object;
    providing a distance signal to a bus;
    receiving in a second microprocessor said distance signal from said bus; and
    providing, in response to receiving said distance signal, a control signal from said second microprocessor to a display.

24. A proximity sensor bus system comprising:
    a data signal and power transfer bus;
    a first plurality of microprocessor based proximity sensors having unique identity data, a proximity data generator and setup storage and coupled to said bus for powering each said sensor and for identify data, proximity data and setup data exchange over said bus; and
    one or more microprocessor based display modules coupled to said bus for identity data, proximity data, and setup data exchange thereover and having indicators responsive to bus data for identifying, for each coupled sensor, sensor identity and proximity from exchanged bus data.

* * * * *